ADJUSTABLE SUPPORTING DEVICE

Filed May 12, 1959

INVENTOR
JAMES WALLS,

BY Stone & Mack
ATTORNEYS

United States Patent Office 2,949,272

Patented Aug. 16, 1960

2,949,272

ADJUSTABLE SUPPORTING DEVICE

James Walls, R.D. #5, Lebanon, Pa.

Filed May 12, 1959, Ser. No. 812,608

6 Claims. (Cl. 248—205)

This invention relates to an apparatus for mounting telephone equipment or equipment similar thereto, that formerly may have been attached directly to a desk, upon a desk. In its broadest aspect it should be termed a desk mounting unit.

The apparatus is arranged to permit a telephone company employee to install telephone equipment upon a wooden, plastic or metal desk without boring holes in the desk for the securement of the equipment thereto, as has been customary heretofore. Such holes are unsightly should the telephone equipment be removed from the legs, sides, or facings of the desks. The telephone equipment usually includes connecting blocks, backboards, bell boxes, inside wiring cables, etc.; all of which is essential in the installation and placing of a telephone upon a desk.

Therefore, the primary object of the invention is to provide a quickly detachable apparatus for mounting telephone equipment upon a desk.

A further object of the invention is to provide an apparatus which permits quick, easy, and certain installations and removals of telephone equipment from a desk.

Another object is to provide an apparatus whereby, in the course of moving a desk from place to place in a room, a subscriber may easily release the entire assemblage of telephone equipment from his desk without a complicated procedure and usually without seeking aid from a telephone company employee.

Still another object is to provide an apparatus which will permit the telephone company employee to assemble the equipment thereon, prior to this arrival at the point where the desk is situated.

Other objects of the invention will become readily apparent as the description of the invention proceeds.

The preferred embodiment of the invention is set forth in the following description and illustrated in the accompanying drawings, wherein.

Figures 1, 2:
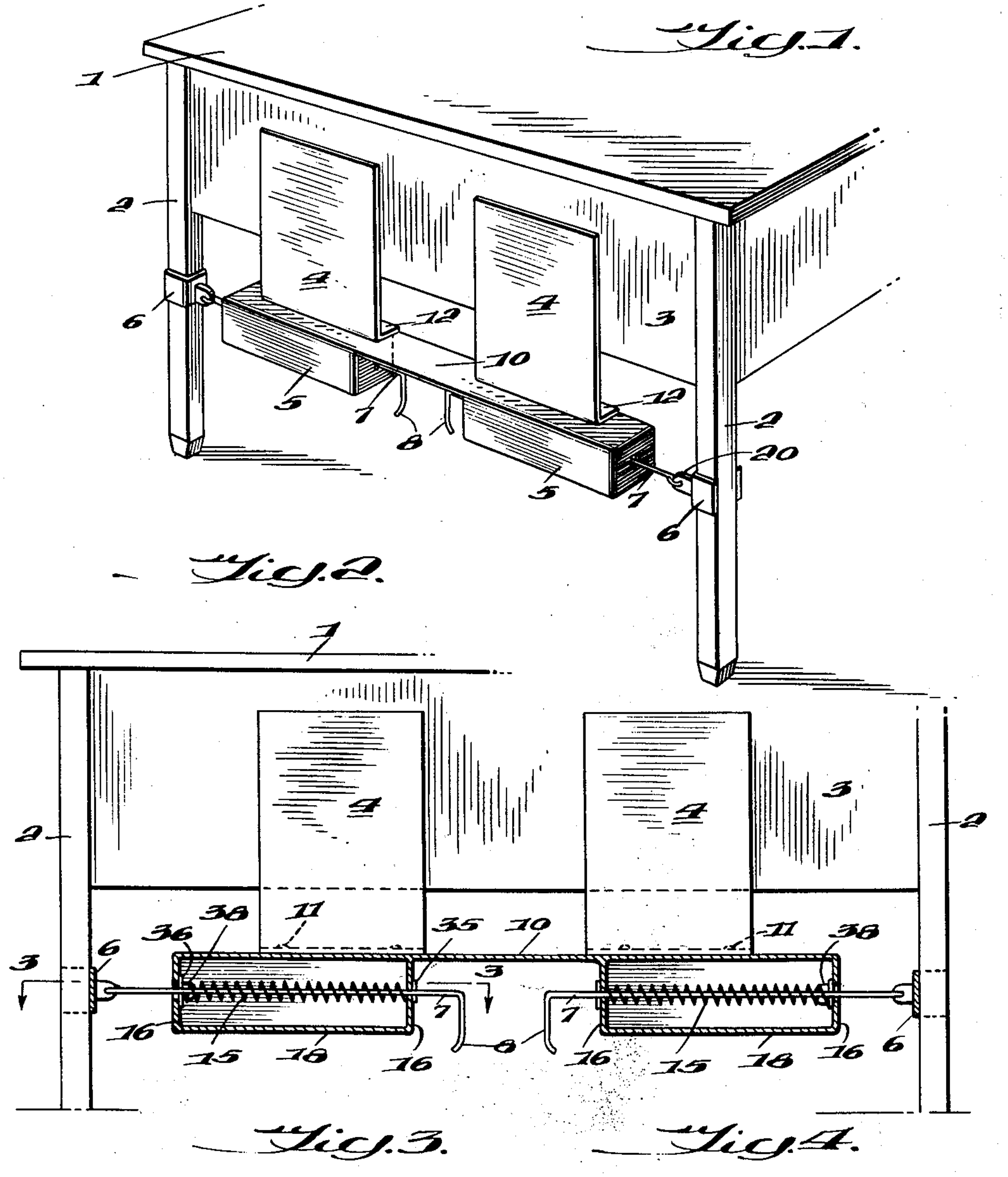
Figure 1 is a perspective view of a conventional desk illustrating the means, provided by this invention, for mounting the apparatus on the end panel of the desk.
Figure 2 is a side elevational view showing a portion of the apparatus in section.

In the accompanying drawings, a conventional desk 1 having square legs 2 is shown. The telephone equipment referred to above, heretofore has usually been securely attached to the side panel 3, leg 2 or knee well panel of the desk by means of screws and holes in said leg or panels. In order to avoid marring of the desk and to provide a quickly mountable and demountable apparatus for holding the telephone equipment, reference is made to Figure 1 showing the apparatus completely assembled. The apparatus includes side plates 4, dust covers or boxes 5, desk leg clamps 6, operating rods 7, and rod handles 8.

The dust covers or boxes 5, 5 are joined together by a one-piece member 10, preferably made of sheet metal of rectangular shape and forming the base upon which are adjustably supported the side plates 4. These plates are vertically disposed adjacent to the side panel 3 of the desk and press against the same. They are adjustable inwardly or outwardly in a horizontal direction with respect to member 10 by fastening means 11, which are attached to member 10 but with respect to which means 11 plates 4 slide in slots provided in the horizontally disposed angle portions 12. Any equivalent means may be provided for adjustably mounting the plates 4 on the member 10, provided the mounting is secure. Upon the plates 4 the telephone equipment is mounted, either on the job or prior thereto.

The member 10 constitutes a coextensive top cover member also for dust covers or boxes 5. These boxes each contain a spring 15 surrounding and supported by a rod 7, said rod passing through openings in the ends 16 of the box, and are slidably mounted in said ends. Each box is made of sheet metal and consists of side wall members 17, end members 16, said end members serving as abutment plates, bottom members 18, and its respective portion of the one-piece member 10. The member 10, as shown bridges, and forms a common, coextensive top cover member for the boxes 5 as well as providing a supporting base for the side plates 4.

Figure 3:
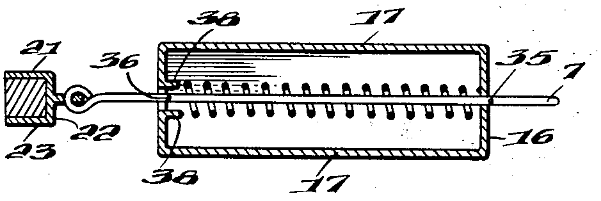
Figure 3 is a sectional view taken on the line 3—3 of Figure 2.

Referring to each box, the rod 7 therein terminates at one end in a handle 8 and is attached at its other end to the desk leg clamp 6 by means of a tab 20, forming a part of the clamp. For desks with square legs, the clamps 6 are formed as shown in Figure 3, provided with portions 21, 22 and 23. These clamps may be made up in different sizes to accommodate square legs of varying dimensions, or they could be made to be adjustable for varying widths of square legs. This feature of the invention is believed to be sufficiently illustrated and forms no inventive feature of the overall combination. When desks are provided with round legs such as shown at 30 in Figure 4, the desk leg clamps are partially circular and consist of two overlapping adjustable portions 31 and 32 shaped as shown and provided with matching holes 33 through which fastening means may be applied to join the portions together, when fitted to the round leg.

As seen more clearly in Figure 3, the rod 7 in each box or dust cover is provided preferably with two pins or abutment members; one pin 35 is placed outwardly of the box end or abutment plate and abuts the outer surface of one of the ends thereof; the other pin 36 is placed inwardly of the box and abuts the inner surface of the other end thereof. Any other suitable abutment member might well be employed. The pin 36 of each box is confined between limit stops or tabs 38 to keep the pin from moving beyond a substantially vertical position.

Figure 4:
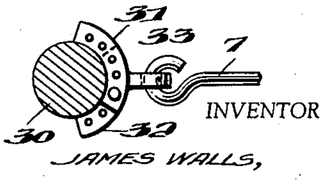
Figure 4 is a fragmentary view of a portion of the apparatus showing the type of clamp employed when a desk is provided with round legs.

The apparatus, forming this invention, is employed as follows. The telephone equipment is securely mounted on plates 4. The apparatus as shown in Figure 1 is applied to the desk by grasping handles 8, 8, and drawing them towards each other, thus compressing springs 15, 15 and shortening the distance between the leg clamp 6, 6. The proper position is then determined and when the handles 8, 8 are released, the leg clamps move away from each other and engage the desk legs 2, 2 under the urging of the springs 15, 15. The springs are sufficiently strong to provide the needed pressure upon the clamps 6, 6. When round desk legs are encountered, the same procedure above set forth is followed; the only change being that the leg clamps shown in Figure 4 are employed. Thus, the clamps are adjustably carried by the rods 7, 7 and urged into position by springs 15, 15. The plates 4, 4 with the telephone equipment thereon are then adjusted horizontally inwardly or outwardly so as to have a firm bearing against the desk panel 3. The limit stops or tabs 38 provided in each box are necessary to prevent the mounting unit from spinning around the rods 7, 7 and probably falling away from the desk.

Having described the invention, what is claimed as new is:

1. A quick detachable equipment mounting device for use with a desk having four supporting legs and side panels therebetween comprising a sheetmetal horizontally disposed rectangular base member of a length less than the distance between two legs of said desk, a plurality of side plates adjustably mounted upon said base member, each plate consisting of a vertical portion and a horizontally disposed portion integral therewith and being at a right angle to said vertical portion and being of a width substantially equal to the width of said base member, two pairs of spaced downwardly disposed abutment plates arranged at right angles to said base member transversely thereof, a rod common to each pair of said abutment plates and slidably carried by said plates, said rod being spaced parallel to said base member and projecting beyond said abutment plates forming thereby one end portion to which a detachable desk leg clamp is attached and a second end portion forming an operating handle, a coiled spring mounted upon and surrounding said rod between said abutment plates and compressibly confined therebetween to urge said desk leg clamp against a desk leg, and an abutment member at two spaced points on said rod adjacent each of said abutment plates to limit the movement of said rod towards said desk leg.

2. The device set forth in claim 1 in which said side plates are adjustably mounted upon said base member and adapted to be moved transversely thereof whereby said plates will contact the desk panel to which they are adjacent upon completion of the attachment of said device to two of said desk legs.

3. The device set forth in claim 1 in which one of said abutment members on said rod abuts its complemental abutment plate on the surface adjacent to said coiled spring and the other of said abutment members abuts its complemental abutment plate on the surface opposite to said coiled spring.

4. The device set forth in claim 1 in which said slidable rods are aligned with each other and are disposed parallel to and beneath the longitudinal axis of said rectangular base member.

5. The device set forth in claim 1 in which the space that intervenes between said pairs of spaced downwardly disposed abutment plates is occupied by the operating handles of said slidable rods.

6. The device set forth in claim 1 in which the surface of the abutment plate that is adjacent to said coiled spring is provided with spaced limit stops adjacent to the abutment member on said rod complemental thereto to limit the movement of said abutment member beyond a vertical position.

References Cited in the file of this patent

UNITED STATES PATENTS

| | | |
|---|---|---|
| 466,940 | Fowler | Jan. 12, 1892 |
| 468,987 | Fowler | Feb. 16, 1892 |
| 596,108 | Ganter | Dec. 28, 1897 |